United States Patent [19]

Szonyi

[11] Patent Number: 4,642,781
[45] Date of Patent: Feb. 10, 1987

[54] SYSTEM FOR AUTOMATICALLY CALIBRATING A ROBOT

[75] Inventor: Laszlo Szonyi, Gamlor, Sweden

[73] Assignee: International Business Machines Corporation, Armonk, N.Y.

[21] Appl. No.: 628,922

[22] Filed: Jul. 9, 1984

[30] Foreign Application Priority Data

July. 22, 1983 [SE] Sweden .............................. SW9-83-005

[51] Int. Cl.$^4$ ........................ G06F 15/46; G05B 19/42
[52] U.S. Cl. .................................... 364/513; 318/568; 318/632; 364/170; 364/571; 901/9; 901/46
[58] Field of Search ........................ 364/513, 191–193, 364/571, 478, 474, 475, 167–171; 901/2–6, 9, 46; 318/568, 632; 414/730

[56] References Cited

U.S. PATENT DOCUMENTS

| | | | |
|---|---|---|---|
| 4,140,953 | 2/1979 | Dunne | 364/513 X |
| 4,356,554 | 10/1982 | Susnjara et al. | 364/513 |
| 4,362,977 | 12/1982 | Evans et al. | 364/513 X |
| 4,403,281 | 9/1983 | Holmes et al. | 364/513 X |
| 4,486,843 | 12/1984 | Spongh et al. | 364/513 |

Primary Examiner—Joseph Ruggiero

[57] ABSTRACT

A system for automatically compensating for inaccuracies of a robot in all degrees of freedom. The system includes moving a measuring body held by the robot gripper in response to a command representative of a previously determined nominal position within a measuring fixture known to the robot controller, determining by means of sensing means differences between pairs of sensed values and using said difference values to iteratively compensate for the error in respective angular coordinate direction $\beta$, $\alpha$ and $\gamma$ and thereafter using the received pairs of equal sensor values to iteratively compensate for the error in respective orthogonal coordinate direction x, y and z. Alternatively, the errors in respective coordinate directions $\beta$, $\alpha$, $\gamma$, x, y and z may be successively calculated and the calculated error values used to successively compensate for the errors in the associated coordinate directions.

11 Claims, 15 Drawing Figures

SYSTEM FOR AUTOMATICALLY CALIBRATING A ROBOT

BACKGROUND OF THE INVENTION

The invention relates to a system for automatically compensating for positioning errors of a robot in all degrees of freedom.

In robot applications the robot gripper is under computer control programmed to successively and repeatedly be positioned and operated in predetermined positions within the work envelope of the robot. Reference is made to an IBM Robot System marketed by IBM as the IBM 7565 Manufacturing System which is well known to those familar with the robotic art.

At the start up of a new work process it is necessary to let the gripper start from an exactly defined home position. Then during operation of the robot, errors in the positioning of the gripper may occur due to errors in some or all of the six coordinate directions. Therefore, calibration and compensation of the robot in all coordinate directions is necessary at suitable time intervals.

Such calibrations have previously been performed by means of separate measurements for each coordinate direction and at different points depending on the coordinate direction to be measured. Then, from the values received, corrections are made in the separate coordinate directions. Such measurements are very time consuming. Besides, as the direction coordinates depend on each other repeated measurements must be performed to get satisfactory precision.

U.S. Pat. No. 4,362,977, issued Dec. 7, 1982, describes such a method and apparatus for calibration of a robot and uses the results of the calibration to compensate for inaccuracies of the robot. The method includes moving the robot gripper to a set of nominal positions, commanded by the robot controller or measured by position encoders built into the robot, and determining the associated actual positions by measuring the robot position with an independent accurate measuring means or by aligning the robot end effector with an accurate calibration mask. The calibration results are stored and subsequently used to compensate for robot inaccuracy so that the robot moves to the actual desired positions.

SUMMARY OF THE INVENTION

The invention as claimed is intended to remedy the above mentioned drawbacks. It solves the problem by iteratively compensating for the errors in the different coordinate directions of movement of the robot. This is performed by letting the robot gripper position a measuring body in a calibrating position within a measuring fixture which is fixedly mounted to the robot frame. The measuring body may, for example, consist of three cube surfaces which are exactly defined in relation to the gripper definition point. The measuring fixture may, for example, consist of an array of sensing means which are positioned in three surfaces of the measuring fixture corresponding to the above mentioned three surfaces of the measuring body. The difference in two suitably chosen sensor values are used for iteratively compensating the robot gripper in an associated angular coordinate direction ($\beta$). This process is repeated for each angular coordinate direction ($a$ and $\gamma$). Thereafter, the pairs of equal sensor values are compared with nominal values in order to iteratively compensate the robot gripper in the orthogonal coordinate directions. Alternatively, the errors in respective coordinate directions $\beta, a, \gamma$, x, y and z may be sucessively calculated and the calculated error values used to sucessively compensate for the errors in the different coordinate directions.

BRIEF DESCRIPTION OF THE DRAWINGS

Two alternative ways of carrying out the invention, which is defined in the attached claims, are described in detail below with reference to the attached drawings which illustrate only one specific embodiment, in which

DESCRIPTION OF THE PREFERRED EMBODIMENT

Figure 1B:
FIG. 1B–D shows the three degrees of freedom of the robot hand.
Figure 1C:
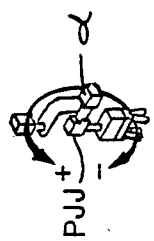
Figure 1D:
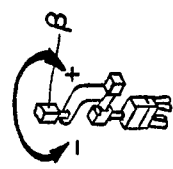
Figure 1A:
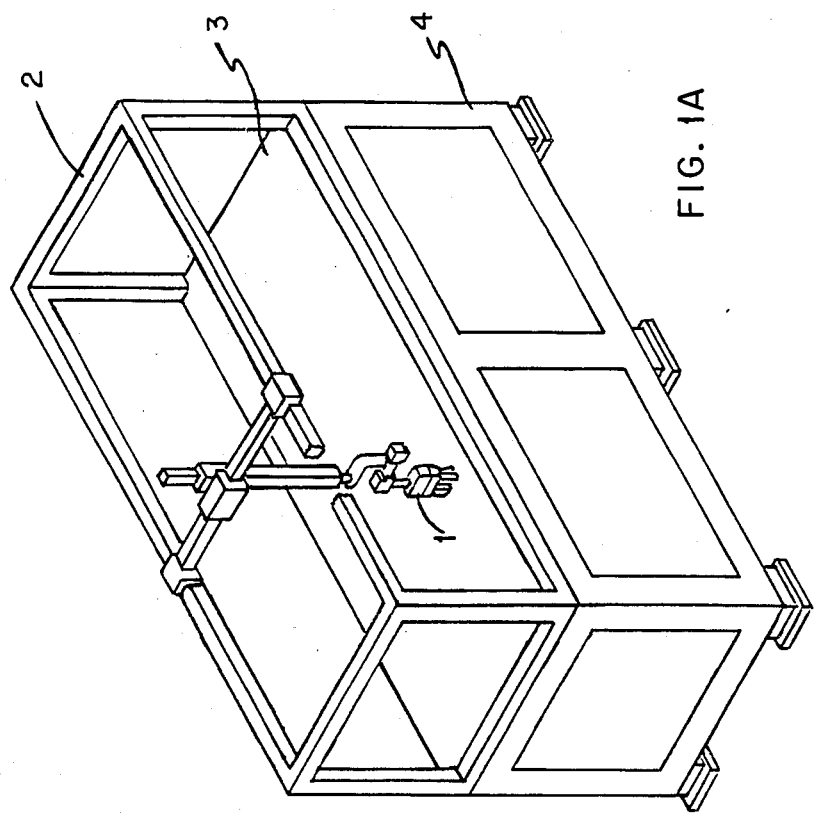
FIG. 1A is an isometric view of a robot system with a robot gripper movable in six degrees of freedom.
Figure 2:
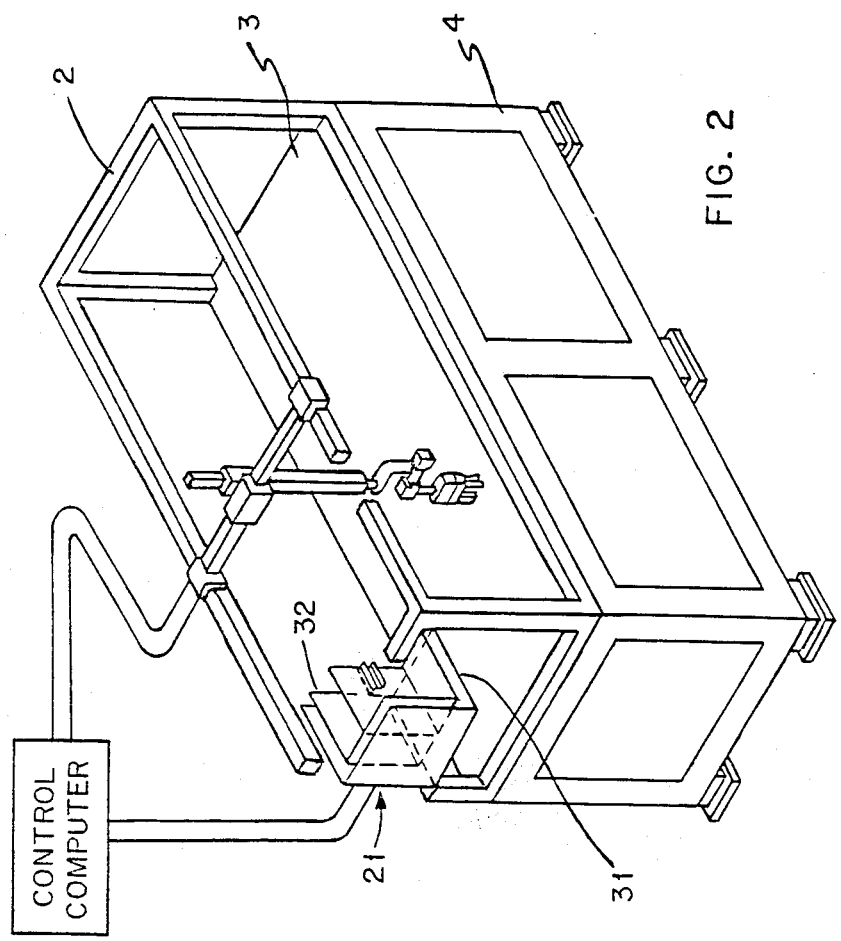
FIG. 2 is an isometric view of a robot system provided with a calibration device in accordance with the invention.

Referring to FIGS. 1 and 2, there is shown a schematic diagram of a robot or object manipulator of the box frame type which is marketed by International Business Machines Corp. under the name of 7565 Manufacturing System. Except for the calibration system as hereinafter described, the remainder of the robot, including its control system, is otherwise known to those skilled in the art. The calibration system of this invention is not limited to this manipulator, but is adaptable to most robots.

In FIG. 1, a robot gripper 1 operates under computer control within the work envelope 2 (shown in phantom) of the robot. The gripper is movable in six coordinate directions, a, $\beta$, $\gamma$, x, y and z, where a is the yaw coordinate, $\beta$ is the pitch coordinate and $\gamma$ is the roll coordinate. Tools and materials are positioned on a work table 3 fixedly mounted to the robot frame 4. These tools and materials are positioned on the work table in exactly defined positions to allow the robot gripper to find and handle them. The work space of the robot is defined by a robot coordinate system x,y,z.

At the start up of a new work process the gripper must first be calibrated and compensated, that means, it must be positioned in a start position which is exactly defined in the robot coordinate system. From that position the robot gripper can start to operate under computer program control. Besides, during the work process of the robot, errors in the positioning of the gripper may occur due to drift in some or all of the six coordinate directions. Then, malfunction of the robot operation may occur if the gripper does not find the tool or material needed. Therefore, compensation of the robot coordinates at suitable time intervals is a requisite.

FIG. 2 shows an isometric view of a robot provided with a calibration device 21 shown in schematic form. The calibration device consists of two main parts (see also FIG. 3), a first part 31 fixed to the robot frame and a second part, a cube formed measuring body 32 which is gripped by the gripper. This second part may be positioned in a suitable position within the work envelope of the robot. In calibration mode the gripper grips the second part and moves it into the calibrating position within said first part of the calibration device. Preferably, the second part is spring mounted in a position within said first part 31. The second part is described more in detail below.

Figure 3:
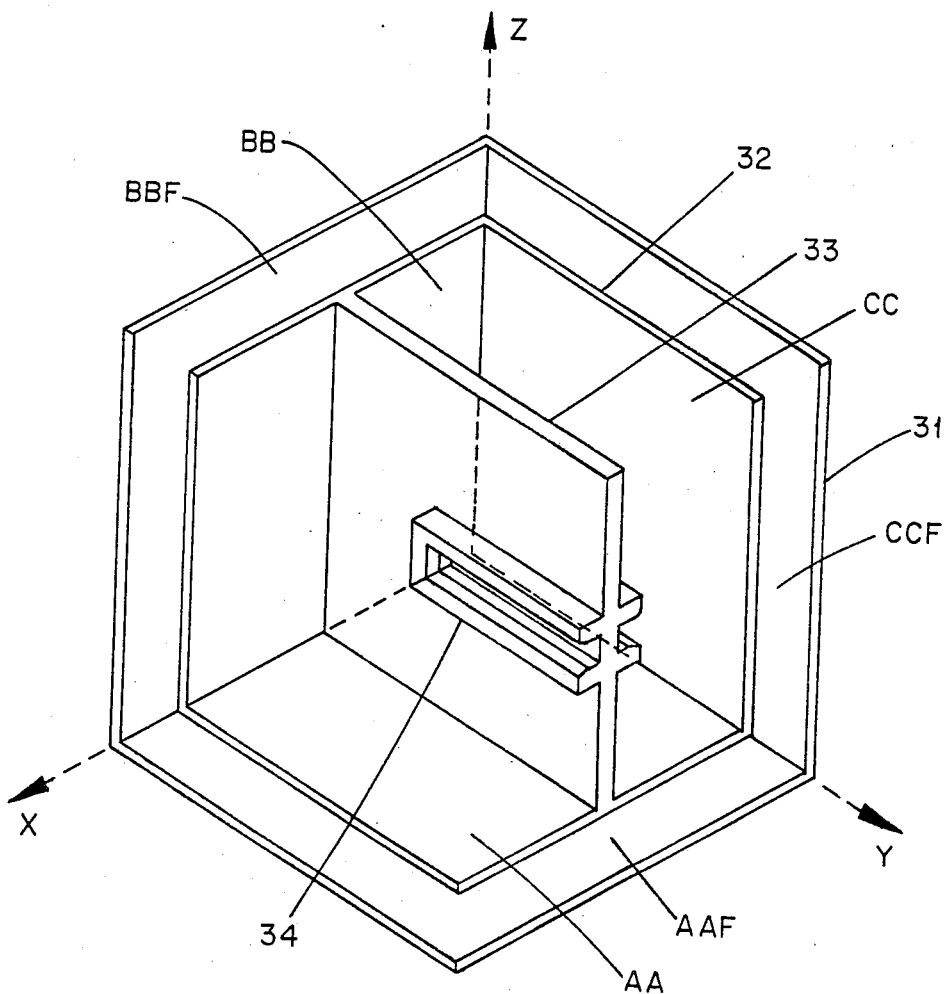
FIG. 3 is an isometric view of the calibration device.
Figure 4:
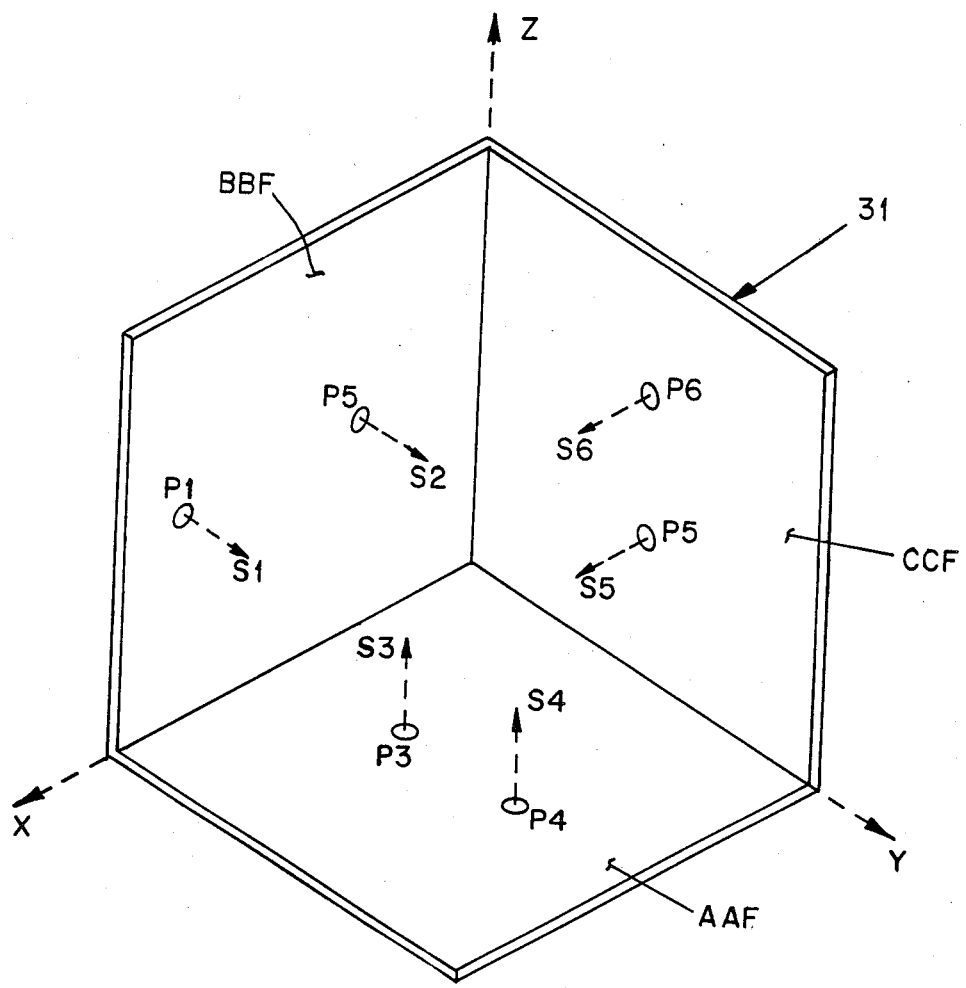
FIG. 4 is an isometric view showing the fixed part of the calibration device.

As shown in FIG. 3 and 4 the fixed part of the calibration device consists of three walls AAF, BBF and CCF of a cube 31. The fixed part is provided with sensing means S1–S6 (indicated in phantom) for determining the position in space of said second part 32, the measuring body, during calibration.

The positions, P1–P6, of the sensors S1–S6 may be as indicated in FIG. 4 or in other suitable positions. Six such sensors are used to define the position in space of the measuring body. Preferably the distribution is two sensors in surface (wall) AAF, two in surface (wall) BBF and two in surface (wall) CCF. The sensors are placed perpendicular to respective surfaces in positions defined for S1-S2 in the x-y-plane, for S3-S4 in the x-z-plane and for S5-S6 in the y-z-plane of the robot coordinate system as indicated in phantom in FIG. 4. Said first calibration part 31 is fixedly mounted to the robot frame in such a way that its coordinate axes x, y, z are exactly parallel to or coincident with (FIG. 5) respective coordinate axes x, y and z in FIG. 1.

The Heidenhain-Metro gauge head MT30 with Heidenhain-Metro counter VRZ181, marketed by the Heidenhain Corp., Elk Grove Village, Ill., can be used as the sensors S1–S6. These devices utilize a plunger which extends vertically from the fixed part 31 of the measuring device.

Figures 5, 5A:
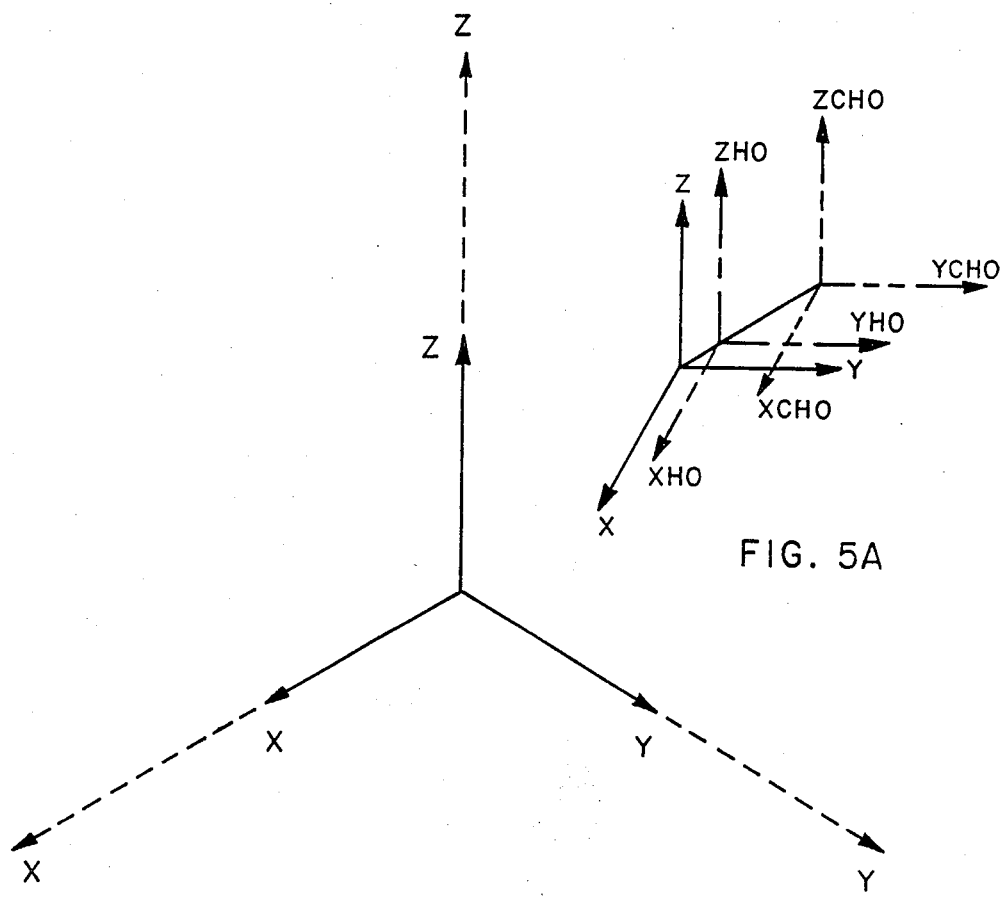
FIGS. 5 and 5A are schematic views showing the coordinate systems used to describe positions in space.

FIG. 5a shows the relationships between the different coordinate systems used. A home coordinate system (XHO, YHO, ZHO) for the measuring body, the measuring cube, is indicated in dashed lines in FIG. 5a. When the measuring body is brought into home position all the sensors indicate predetermined values. Accordingly, the robot gripper is in an exactly defined start position. FIG. 5a also shows the cube central home coordinate-system (xCHO, yCHO, zCHO), that is, a coordinate system coinciding with the cube central coordinate system, when the cube is in its home position. The central cube coordinate system (xC, yC, zC) has its origin in the central point of the measuring cube and has its axes perpendicular to the cube surfaces.

Figure 6:
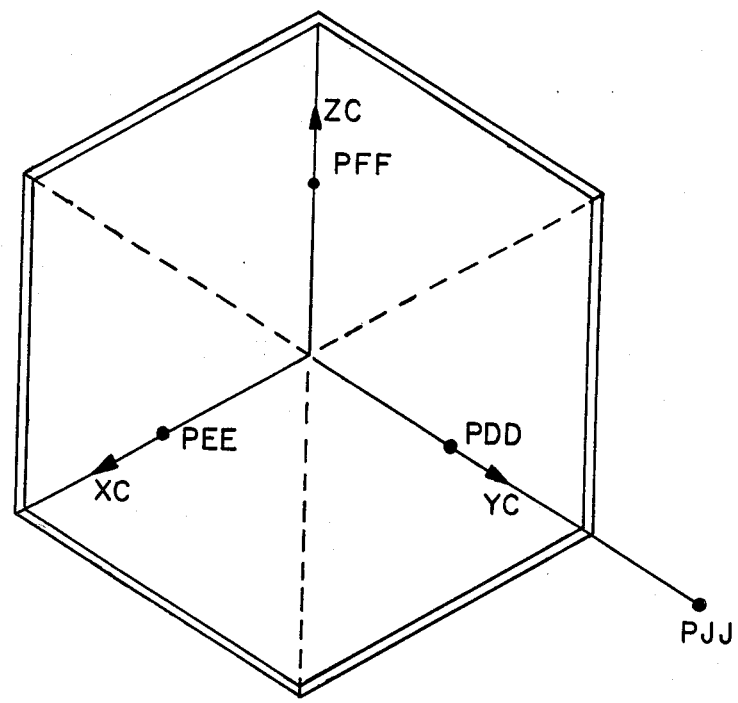
FIG. 6 is an isometric view of the measuring cube with an inserted cube coordinate system.

FIG. 6 shows the intersectional points PEE, PDD and PFF between the positive cube central coordinate x-axis, y-axis and z-axis and the imaginary cube surfaces EE, DD and FF, respectively. The joint point PJJ is situated on the yC-axis of the cube.

Figure 7:
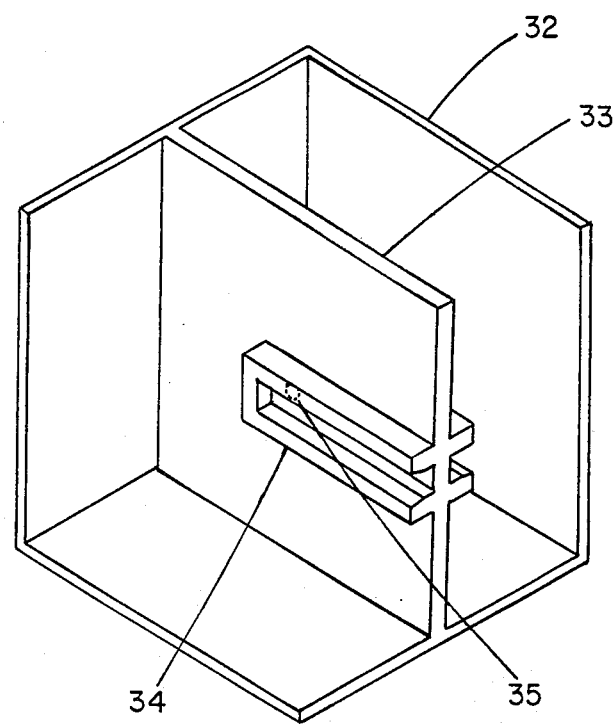
FIG. 7 is an isometric view of the measuring body.
Figure 8A:
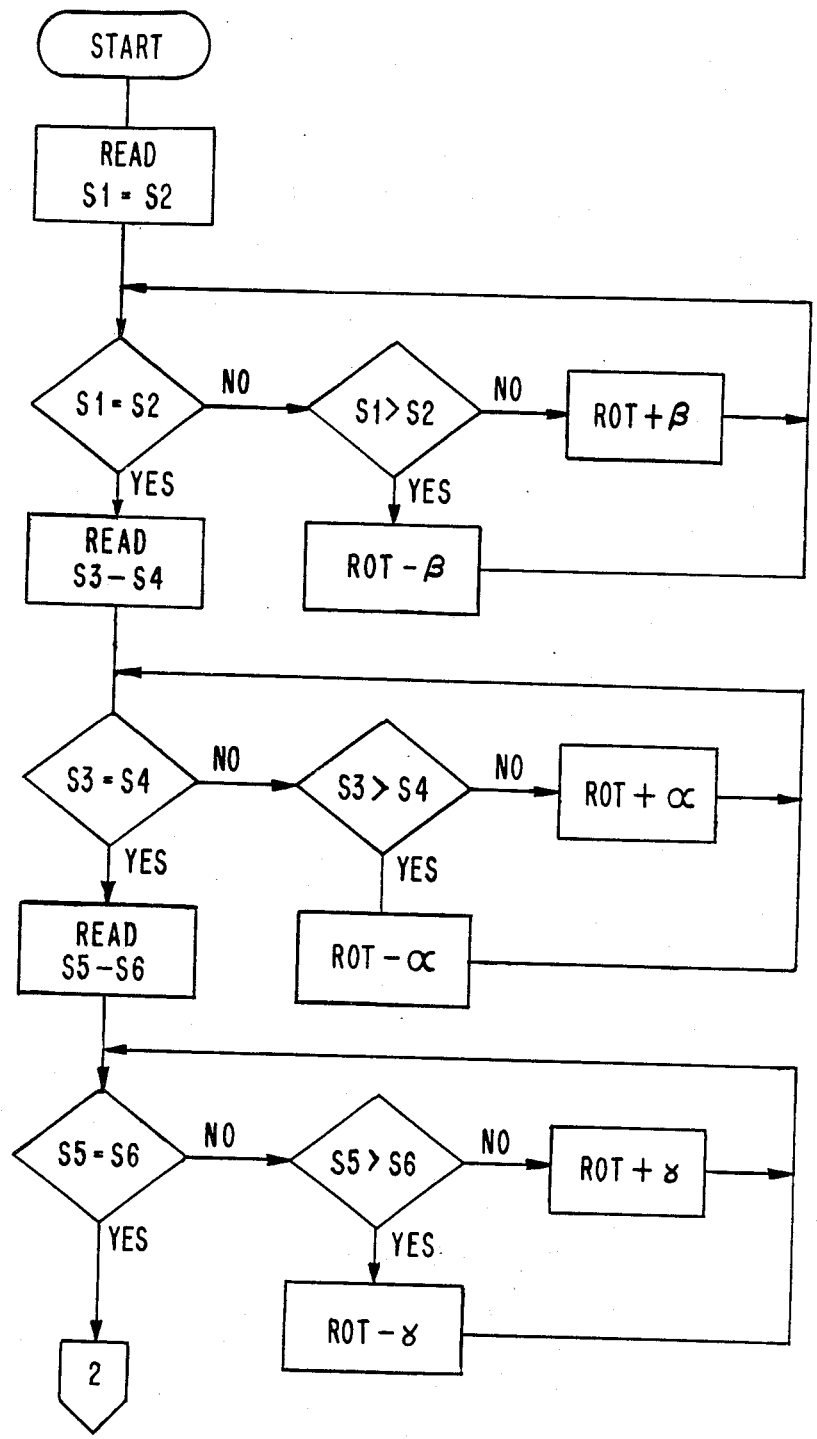
FIGS. 8A and 8B is a flow diagram illustrating the operation of the invention according to a first alternative.
Figure 8B:
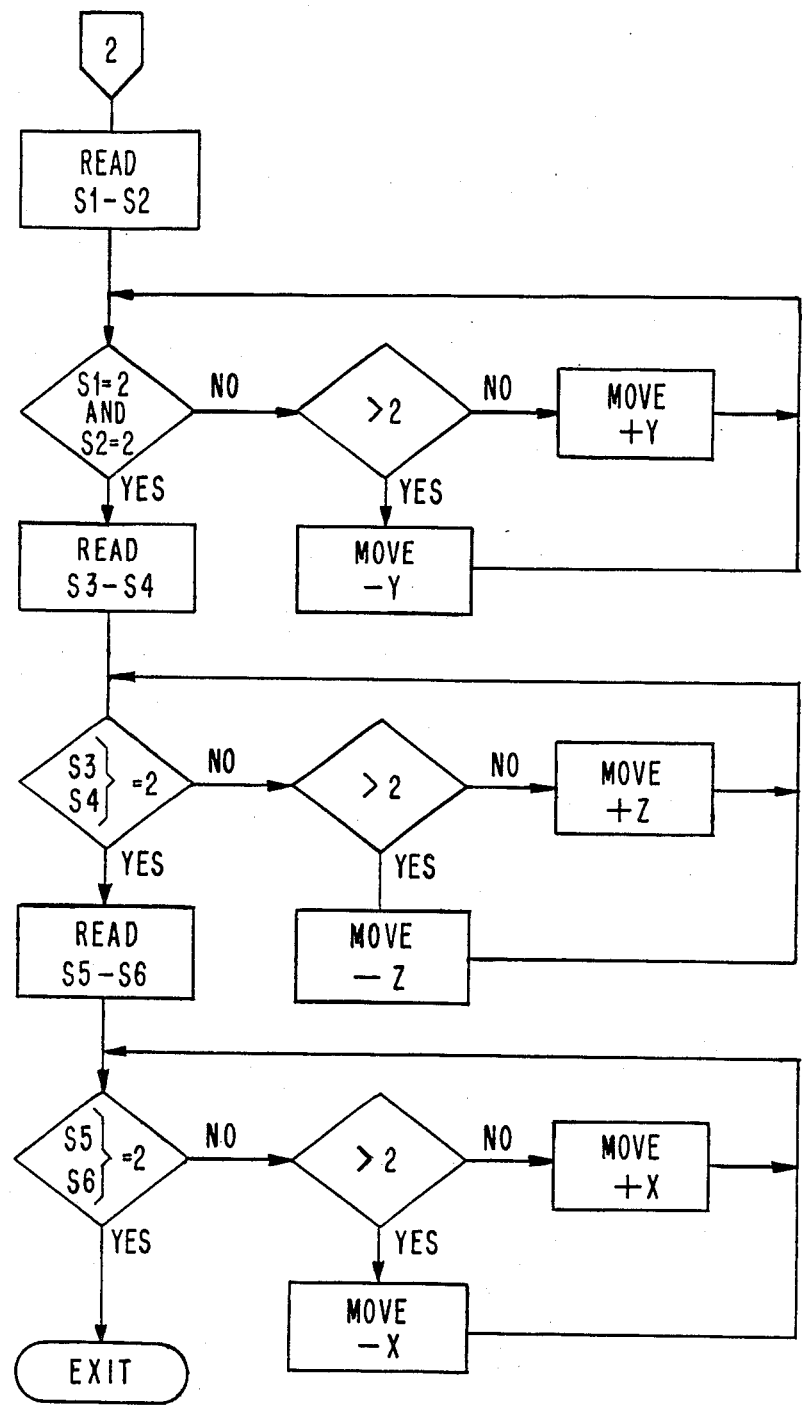
Figure 9A:
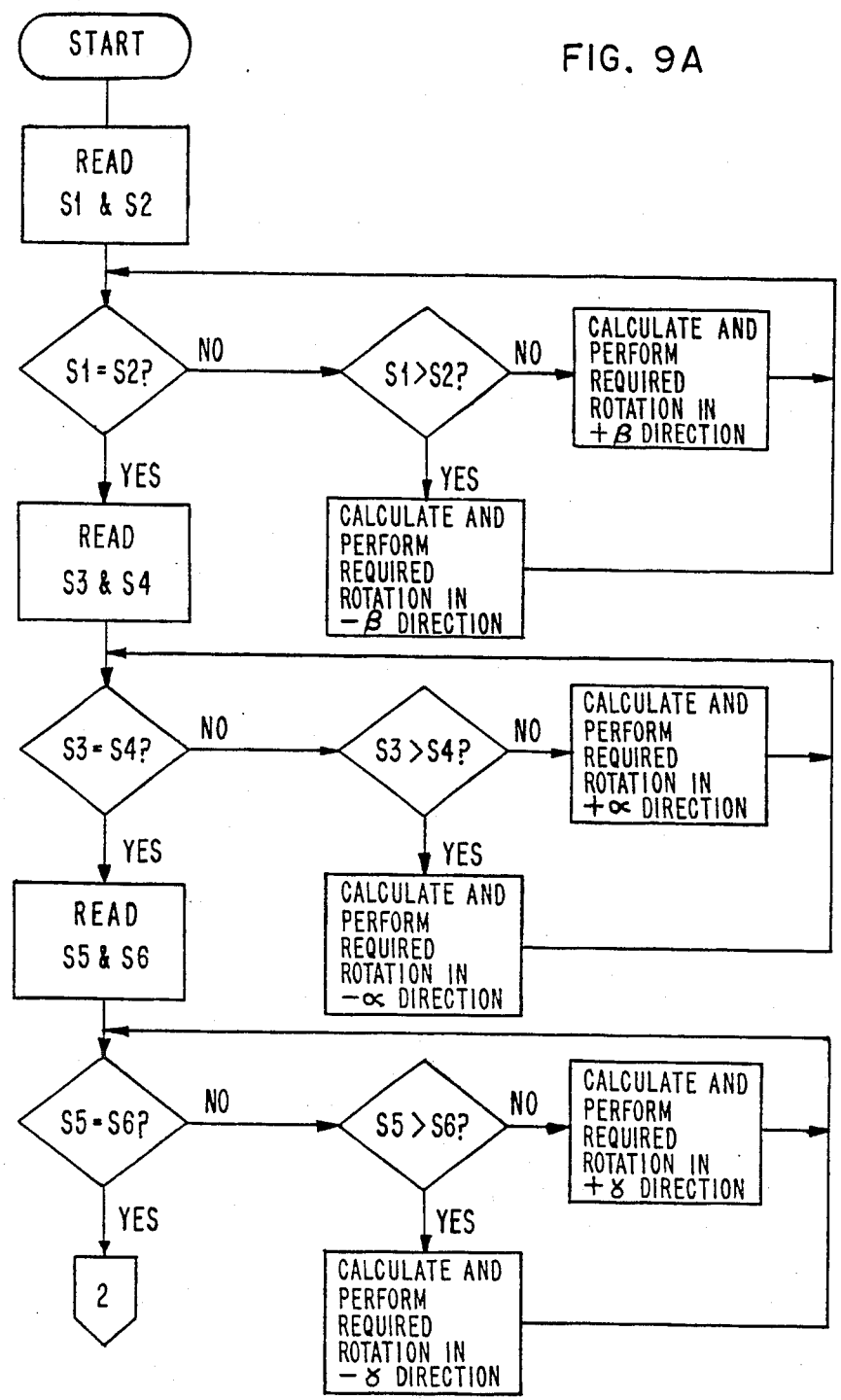
FIG. 9A and 9B is a flow diagram illustrating the operation of the invention according to a second alternative.
Figure 9B:
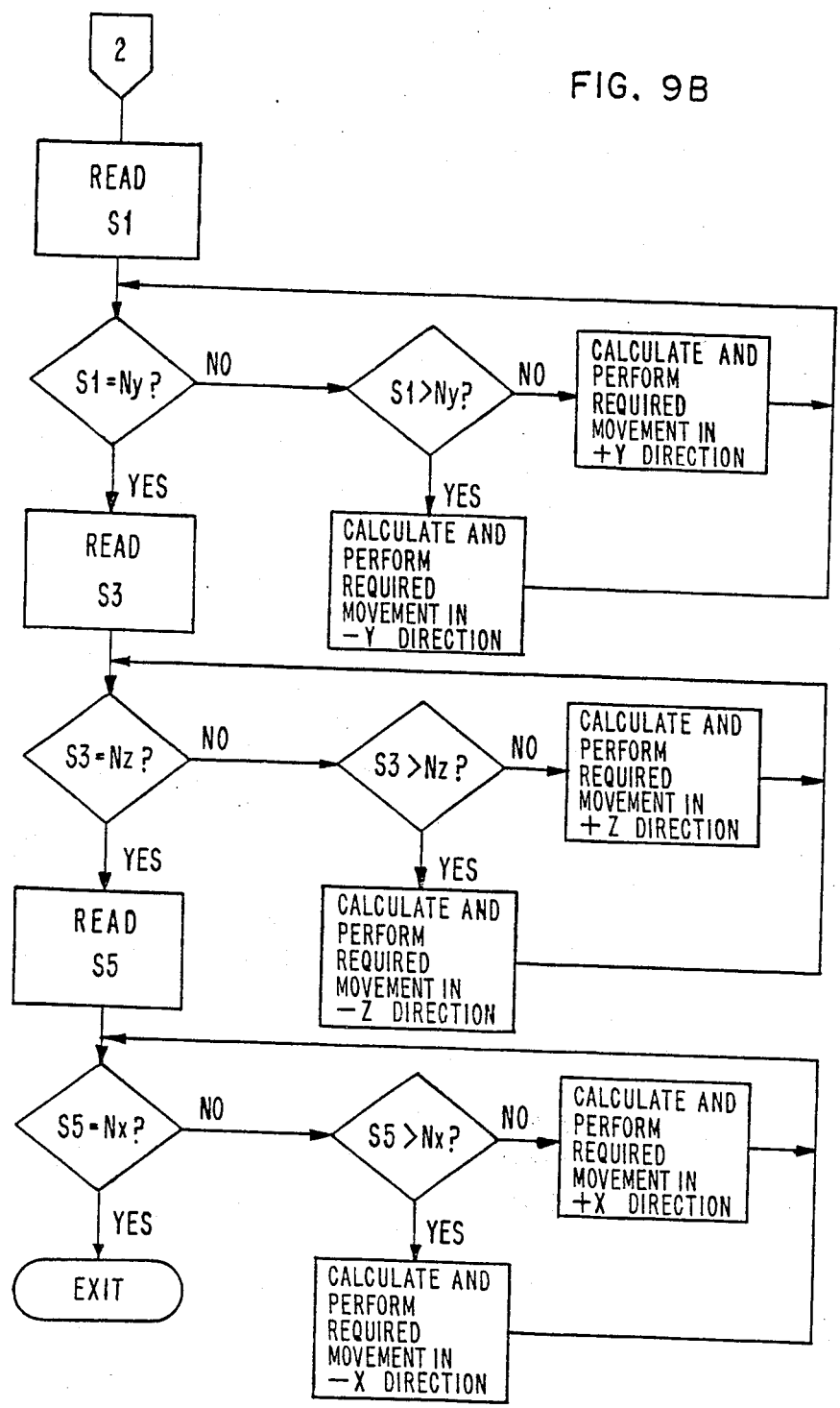

FIG. 7 is a separate view of the measuring cube. The cube is provided with an intermediate wall 33 having a guiding profile 34 for guiding the cube definition point 35 to coincide with a corresponding definition point on the gripper when the gripper grips the cube. The gripper 1 is positioned by the robot control and program such that the fingers of the gripper close into the grooves of guiding profile 34 so that the cube definition point 35 lines up with the corresponding reference point on the gripper.

The automatic compensating process is described below with reference to the flow diagrams in FIGS. 8A, 8B and FIGS. 9A, 9B which illustrate two alternative methods for performing the invention.

At the start of the compensating mode the robot gripper grips, under computer program control, the measuring body 32 and moves it into a calibrating position within the measuring fixture 31. Alternatively, the robot gripper grips the measuring body 32 in a premeasuring position within the measuring fixture 31.

According to a first alternative of the invention the compensating process is performed by the following main steps a–g:

(a) The sensor values S1 and S2 are read and compared with each other. If S1 is equal to S2 the process is continued with the main step (b). If S1 is not equal to S2 an iterative process is started. If S1 is greater than S2 the robot gripper is ordered to move (rotate) in the $-\beta$ coordinate direction. If S2 is greater than S1 the robot gripper is ordered to move (rotate) in the $+\beta$ coordinate direction. This iterative process is continued until S1 is equal to S2 whereupon, (b) The sensor values S3 and S4 are read and compared with each other. If S3 is equal to S4 the process is continued with the main step (c). If S3 is not equal to S4 an iterative process is started. If S3 is greater than S4 the robot gripper is ordered to move (rotate) in the $-\alpha$ coordinate direction. If S4 is greater than S3 the robot gripper is ordered to move (rotate) in the $+\alpha$ coordinate direction. This iterative process is continued until S3 is equal to S4 whereupon, (c) The sensor values S5 and S6 are read and compared with each other. If S5 is equal to S6 the process is continued with the main step (d). If S5 is not equal to S6 an iterative process is started. If S5 is greater than S6 the robot gripper is ordered to move (rotate) in the $-\gamma$ coordinate direction. If S6 is greater than S5 the robot gripper is ordered to move (rotate) in the $+\alpha$ coordinate direction. This iterative process is continued until S5 is equal to S6 whereupon, (d) The sensor value S1 (or S2, which now is equal to S1) is read and compared with a predetermined, nominal value, NY (2 in the example). If S1 is equal to NY the process continues with the main step (e). If S1 is not equal to NY an iterative process is started. If S1 is greater than NY the robot gripper is ordered to move in the $-y$ coordinate direction. If NY is greater than S1 the robot gripper is ordered to move in the $+y$ coordinate direction. This process is continued until S1 is equal to NY whereupon, (e) The sensor value S3 (or S4, which now is equal to S3) is read and compared with a predetermined, nominal value, NZ (2 in the example). If S3 is equal to NZ the process is continued with the main step (f). If S3 is not equal to NZ an iterative process is started. If S3 is greater than NZ the robot gripper is ordered to move in the $-z$ coordinate direction. If NZ is greater than S3 the robot gripper is ordered to move in the $+z$ coordinate direction. This process is continued until S3 is equal to NZ whereupon, (f) The sensor value S5 (or S6, which now is equal to S5) is read and compared with a predetermined, nominal value, NX (2 in the example). If S1 is equal to NX the robot gripper is completely compensated for the errors in all coordinate directions and the process is continued by the main step (g). If S5 is not equal to NX an iterative process is started. If S5 is greater than NX the robot gripper is ordered to move in the $-x$ coordinate direction. If NX is greater than S5 the robot gripper is ordered to move in the +x coordinate direction. This process is continued until S5 is equal to NX whereupon the robot gripper is completely compensated for the errors in all coordinate directions.

(g) The robot is returned from compensating mode to normal operating mode.

According to a second alternative of the invention the compensating process is performed by the following main steps (k-q), (k) The sensor values S1 and S2 are read and compared with each other. If S1 is equal to S2 the process is continued with the main step (l). If S1 is greater than S2 the error in the $\beta$ coordinate direction is calculated by the formula $\Delta\beta1 = \arctan[(S1-S2) \div d1]$ where d1 is the distance between P1 and P2. Then, the robot gripper is ordered to rotate $-\Delta\beta°$. If S2 is greater than S1 the error in the $\beta$ coordinate direction is calculated by means of the formula $\Delta\beta2 = \arctan[(S2-S1) \div d1]$. Then, the robot gripper is ordered to rotate $+\Delta\beta°$.

(l) The sensor values S3 and S4 are read and compared with each other. If S3 is equal to S4 the process is continued with the main step (m). If S3 is greater than S4 the error in the $\alpha$ coordinate direction is calculated by the formula $\Delta\alpha1 = \arctan[(S3-S4) \div d2]$, where d2 is the distance between P3 and P4. Then, the robot gripper is ordered to rotate $-\Delta\alpha°$.

If S4 is greater than S3 the error in the $\alpha$ coordinate direction is calculated by the formula $\Delta\alpha2 = \arctan[(S4-S3) \div d2]$. Then, the robot gripper is ordered to rotate $+\Delta\alpha°$.

(m) The sensor values S5 and S6 are read and compared with each other. If S5 is equal to S6 the process is continued with the main step (n). If S5 is greater than S6 the error in the $\gamma$ coordinate direction is calculated by the formula $\Delta\gamma1 = \arctan[(S5-S6) \div d3]$, where d3 is the distance between P5 and P6. Then, the robot gripper is ordered to rotate $-\Delta\gamma°$. If S6 is greater than S5 the error in the $\gamma$ coordinate direction is calculated by the formula $\Delta\gamma2 = \arctan[(S6-S5) \div d3]$. Then, the robot gripper is ordered to rotate $+\Delta\gamma°$.

(n) The sensor value S1 (or S2, which now is equal to S1) is read and compared with a predetermined, nominal value, NY, (2 in the example). If S1 is equal to NY the process is continued with the main step (o). If S1 is greater than NY the robot gripper is ordered to move $-\Delta y = -(S1-NY)$ in the coordinate direction. If NY is greater than S1 the robot gripper is ordered to move $+\Delta y = +(NY-S1)$ in the y coordinate direction.

(o) The sensor value S3 (or S4, which now is equal to S3) is read and compared with a predetermined, nominal value, NZ, (2 in the example). If S3 is equal to NZ to process is continued by the main step (p). If S3 is greater than NZ the robot gripper is ordered to move $-\Delta Z = -(S3-NZ))$ in the Z coordinate direction. If NZ is greater than S3 the robot gripper is ordered to move $+\Delta Z = +(NZ-S3)$ in the Z coordinate direction.

(p) The sensor value S5 (or S6, which now is equal to S5) is read and compared with a predetermined, nominal value, NX, (2 in the example). If S5 is equal to NX the robot gripper is completely compensated in all coordinate direction and the process is continued by the main step (q). If S5 is greater than NX the robot gripper is ordered to move $-\Delta x = -(S1-NX)$ in the x coordinate direction. If NX is greater than S5 the robot gripper is ordered to move $+\Delta x = +(NX-S5)$ in the x coordinate direction.

(q) The robot is returned from compensating mode to normal operating mode.

I claim:

1. A system for automatically compensating for positioning errors of a robot gripper in all degrees of freedom in a robot or like system,
characterized by the steps of
grasping a measuring device at a predetermined reference point with the robot gripper so that a predetermined gripper reference point aligns with said predetermined measuring device reference point;
moving said measuring device held by the robot gripper in response to a command representative of a predetermined nominal position within a measuring fixture known to the robot controller;
determining, by actual measurement by means of a plurality of pair of sensors the difference between sensor values of a first pair of sensors and using this difference between sensor values of a first pair of sensors for moving the robot gripper in order to compensate for an error in an associated first angular coordinate direction; thereby reducing the difference between sensor values of the first pair of sensors until the sensor values are equal;
successively repeating the determining step using each difference between sensor values of successive pairs of sensors in order to compensate for errors in respective associated angular coordinate directions, thereby reducing the difference between sensor values of successive pairs of sensors until the respective sensor values are equal
comparing the equal sensor values of said first pair of sensors with a first nominal value representative of said predetermined nominal position of the measuring device,
using the difference value obtained by said comparing step for moving the robot gripper in order to compensate for an error in an associated first orthogonal coordinate direction,
successively repeating said comparing and said using steps using each equal sensor values of successive pairs of sensors in order to compensate for errors in respective associated orthogonal coordinate directions.

2. A system according to claim 1, characterized in that said measuring device consists of a number of surfaces, the positions of which are exactly defined in relation to the gripper.

3. A system according to claim 2, characterized in that the surfaces are perpendicular to each other.

4. A system according to claim 1, characterized in that the measuring device is in the form of three cube surfaces and is held by the gripper so that the gripper definition point coincides with the cube central point.

5. A system according to claim 4, characterized in that the measuring device is provided with an intermediate wall having a guiding profile for guiding the cube definition point to coincide with the gripper definition point.

6. A system according to claim 1, characterized in that the measuring fixture consists of a number of surfaces, the positions of which are exactly defined in relation to the robot coordinate system, the surfaces being provided with said pairs of sensors in a predetermined pattern.

7. A system according to claim 6, characterized in that the surfaces are perpendicular to each other.

8. A system according to claim 6, characterized in that the measuring fixture is in the form of three surfaces of a cube.

9. A system according to claim 8, characterized in that the distribution of said pairs of sensors are two in a first cube surface, two in a second cube surface and two in a third cube surface.

10. A system according to claim 1, characterized in that said difference between sensor values are used to iteratively compensate for the error in respective coordinate direction $\beta$, $\alpha$, $\gamma$, x, y, z.

11. A system according to claim 1, characterized in that said difference between sensor values are used to calculate the errors in respective coordinate directions ($\beta$, $\alpha$, $\gamma$, x, y, z) and in that the robot gripper is moved in order to successively compensate for the calculated errors in respective coordinate directions.

* * * * *